United States Patent
Spencer

[15] 3,698,357
[45] Oct. 17, 1972

[54] GRID FOR PRODUCING AN ELECTROSTATIC FIELD

[72] Inventor: Francis T. Spencer, Biddeford, Maine

[73] Assignee: West Point-Pepperell, Inc., Boston, Mass.

[22] Filed: Dec. 5, 1969

[21] Appl. No.: 882,466

[52] U.S. Cl. .................... 118/636, 174/126, 317/3, 117/17
[51] Int. Cl. ........................... B05b 5/02, H01b 5/00
[58] Field of Search ........ 118/636, 638, 640; 117/17; 174/126, 128; 219/10.79, 10.81; 317/3

[56] References Cited

UNITED STATES PATENTS

| 2,675,330 | 4/1954 | Schwartz et al. ........ 118/636 X |
|---|---|---|
| 2,742,018 | 4/1956 | Lindquist .................. 118/636 |
| 2,976,839 | 3/1961 | Okma et al. ............ 118/640 X |
| 3,269,356 | 8/1966 | Friderici .................. 118/640 |
| 3,379,175 | 4/1968 | Spencer .................... 118/636 |
| 3,408,986 | 11/1968 | Walsh et al. .............. 118/636 |
| 3,415,222 | 12/1968 | Roberts et al. ........... 118/636 |
| 3,441,660 | 4/1969 | Garner .................. 174/126 X |
| 3,496,413 | 2/1970 | Goodridge et al. .......... 317/3 |

Primary Examiner—James Kee Chi
Attorney—Roberts, Cushman & Grover

[57] ABSTRACT

A grid for producing an electrostatic field of high intensity, capable of employing, for the purpose, alternating current in a range from 40,000 volts to 100,000 volts or more without arcing or rapid deterioration of the grid.

9 Claims, 4 Drawing Figures

PATENTED OCT 17 1972

3,698,357

Inventor
Francis T. Spencer
by Roberts Cushman Grover
Attys

GRID FOR PRODUCING AN ELECTROSTATIC FIELD

The present invention pertains to a grid for establishing an electrostatic field of high intensity, useful in distributing flock fibers over an adhesively coated substrate of substantial width, for example, 72 inches or more, while the substrate is moving, said grid comprising a unitary length of metallic conductor embedded in insulating material having a dielectric constant of from 2.25 to 2.35 at 60 cycles, said insulated conductor being arranged to form a plurality of spaced parallel bars 6 inches on centers, adjacent bars being united at smooth U-bends of a radius of approximately 3 inches, the opposite ends of the conductor being connected to a source of alternating current at from 40,000 to 100,000 volts.

BACKGROUND OF THE INVENTION

In depositing flock fibers upon an adhesively coated substrate, it has been found that, in order that the individual flock fibers, when attached to the substrate, shall be substantially perpendicular thereto, it is desirable to provide an electrostatic field through which the falling flock fibers pass when dropping from an elevated distributing device onto the substrate. Most prior flock depositing apparatus, incorporating this idea, have employed direct electrical current in producing the electrostatic field.

However, it has been discovered that an electrostatic field produced by alternating current is more effective for use in applying flock fibers than a field produced by direct current.

No substantial difficulty has been experienced in designing an acceptable grid which is energized by alternating current so long as the potential does not substantially exceed 10,000 volts, and that potential is sufficient when dealing with short length (less than 2 mm.) fibers of a coarse denier, for example, 10 denier or more, as used in carpet manufacturing. At that potential no serious difficulty arises from undue arcing.

As a result of experiment, grids designed to establish electrostatic fields created by alternating current of 40,000 volts have been devised, and such grids have been found effective (although somewhat short lived) in applying flock of a length of 2 mm. and of a fineness of from 3 to 18 denier and even when applying such flock in substantial quantities to cover a large area such as bed-blanket material. However, it has been found desirable for the latter and other purposes to use flock fiber of a length exceeding 2 mm. — for example up to one-half inch and of a low denier; for this purpose a potential of 40,000 volts is insufficient and in order to distribute flock fibers of such greater lengths and low denier, a much higher voltage is required, for example, up to 100,000 volts. If such a voltage were to be applied to any known grids of prior types, a breakdown might be expected.

The present invention has for objects the provision of a novel grid construction, such that it will function for the intended purpose and during a reasonably long service life when energized by alternating current as great as 100,000 volts.

The present invention does provide a grid of such construction as to produce an electrical field by alternating current which may be of very high intensity, whereby optimum results are obtained even with respect to the deposit of long and fine flock fibers and without arcing, even at high voltages, and whereby it is made possible to produce a dense, uniformly thick layer of flock fibers of a length of from 2 mm. and upward and of a denier of from 3 to 18, upon a substrate of a width up to and exceeding 72 inches.

In the attainment of this result the present invention provides a grid comprising a unitary length of metallic conductor embedded in insulation having high dielectric strength and which is normally shape-retaining but sufficiently flexible so that it may be bent, without breaking, by the application of sufficient force. The plastic, polyethylene, has these desirable characteristics. The matrix of insulation in which the conductor is embedded is of an elongate cylindrical shape with the conductor arranged coaxially with the insulation and with the ends of the conductor extending outwardly beyond the ends of the insulation. The insulation, with the internal conductor, is bent to provide a grid comprising parallel bars, and the ends of the conductor, exposed at the ends of the outermost bars, are connected to a source of alternating current of high voltage.

Figure 4:
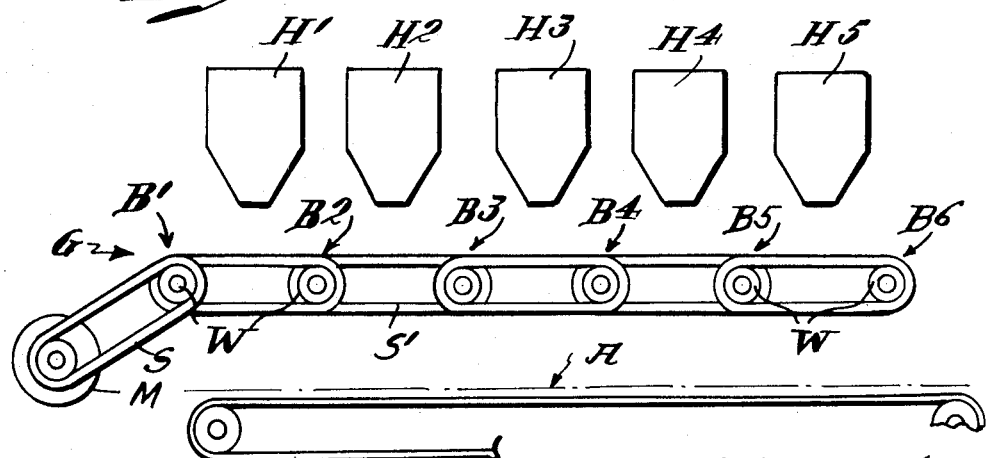
FIG. 4 is a fragmentary diagrammatic front elevation of a flocking machine, showing the flock-supply hoppers, the support for the substrate and the means for rotating the sleeves of the several grid bars.

Referring to the drawings FIG. 4 illustrates, in front elevation, and diagrammatically, a flock applying machine such as is described in the patent to Spencer U.S. Pat. No. 3,379,175 dated Apr. 23, 1968, but modified by the substitution of the improved grid of the present invention for that disclosed in the patent.

Figure 1:
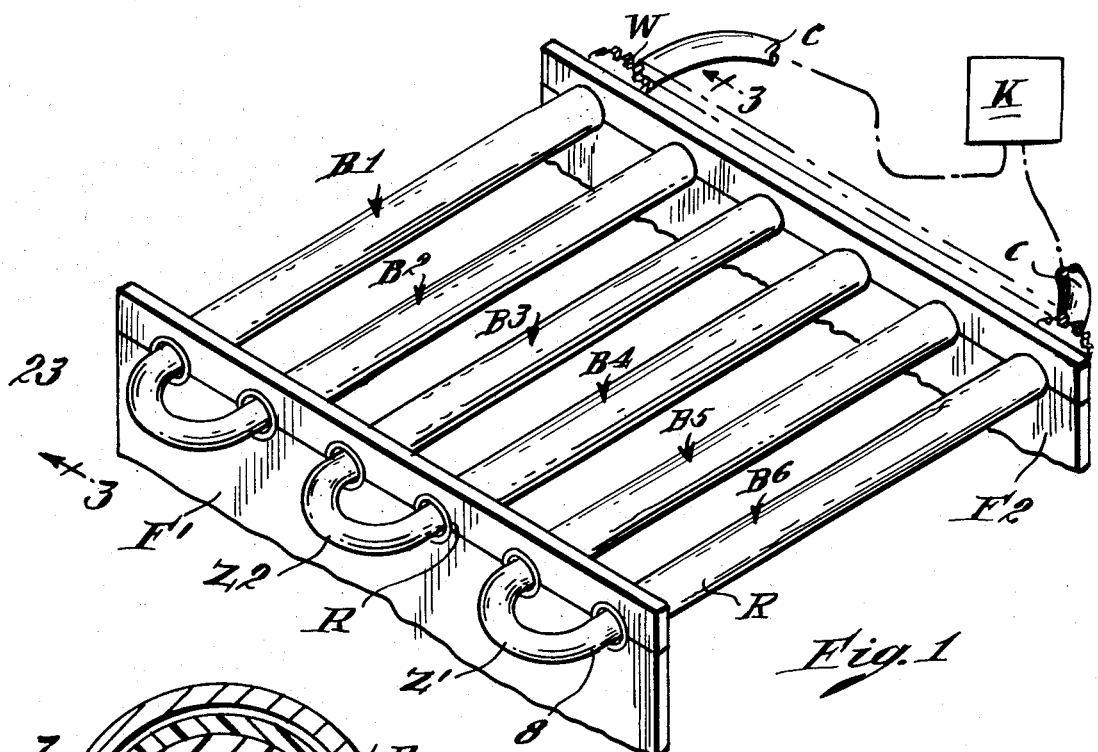
FIG. 1 is a fragmentary diagrammatic perspective view, showing the improved grid designed to establish a high-potential electrostatic field by the use of alternating current.

As herein shown (FIG. 4) the machine comprises five flock supplying hoppers $H_1$, $H_2$, $H_3$, $H_4$, and $H_5$ and below the hoppers a grid G through which the fibers fall, the grid comprising six parallel grid bars B1, B2, etc., these bars being parallel, (FIG. 1) spaced apart and with their axes in a horizontal plane. Below the grid is an endless, moving belt E (FIG. 4) which carries the adhesively coated substrate A upon which the fibers fall.

Figure 2:
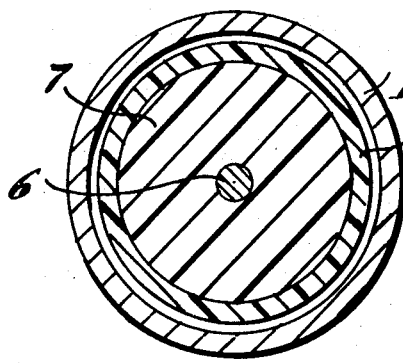
FIG. 2 is a radial section, to larger scale, of one of the grid bars, showing the conductor.

The grid structure comprises a single length of metallic conductor 6 (FIG. 2) which, for example, may be of braided copper wire, and which is embedded at the axis of a cylindrical insulating matrix or jacket 7. The material of this jacket should be such as to have a high dielectric strength and at the same time it should be normally shape-retaining and bendable (in response to the application of sufficient force) through an arc of 180° without breaking. This latter requisite is such as to eliminate ceramic materials from consideration. While most of the synthetic plastics are flexible, and many have been tried experimentally, most of them do not have the desired dielectric strength. However, polyethylene has been found to combine the above named desirable characteristics, as it can be bent through an arc of a radius of 3 inches, through an angle of 180° without cracking or breaking, while, on the other hand, it is rigid and shape-retaining under most circumstances and if this jacket be of a radial thickness of one-half inch, it provides ample insulation, even when the conductor is loaded up to 100,000 volts. To provide additional mechanical strength and, incidentally, for its added insulation value, the polyethylene jacket is encased in a seamless fiberglass tube T.

Figure 3:
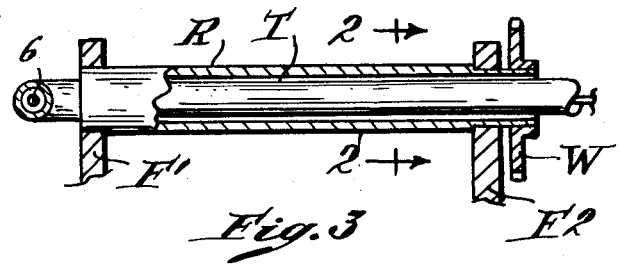
FIG. 3 is an axial diagrammatic section on the line 3—3 of FIG. 1.

As herein illustrated, the conductor 6 (with its insulating jacket and encasing tube) is bent (FIG. 4) to provide parallel rectilinear portions or bars, adjacent bars B1, B2, etc. being parallel and horizontal and integrally joined at smooth, U-shaped bends Z1, Z2, etc. In accordance with a preferred embodiment, each of the stationary bars B1, B2, etc. passes through a coaxial, tubular, rotatable roll R (FIGS. 3 and 4). These rolls may, for example, be of polyvinyl chloride. A sprocket wheel W (FIGS. 1, 3 and 4) is fixed to one end of each roll R and is slowly rotated by a motor M (FIG. 4) through appropriate connections S, S', such for example, as described more fully in the Spencer U.S. Pat. No. 3,379,175.

The opposite ends of the conductor are preferably joined and are connected by suitable insulated cable C to a device K (FIG. 1), (conventional, if desired) which supplies alternating current at desired voltages, for example, from 10,000 to 100,000.

The bars B1, B2, etc. constituted by the bent, insulated conductor 6 are supported near their ends by stationary frame members F1 and F2 (FIG. 3).

The grid supporting frame members F and F1 are made in sections so that the conductor, with its insulating jacket 7 and protective sleeve T, may be threaded through one of the rolls R at a time, then bent and threaded through the next roll etc. until the entire assembly has been formed and, then the several rolls are deposited in bearing openings in the lower frame member, and the upper frame member is put in place.

While the grid device herein disclosed is of general use where an electrostatic field of high intensity is desired, its most useful field, so far as is now known, is in the application of flock fibers, especially those of a length of 2 mm. or more and of a denier exceeding No. 1 and up to No. 18 or more, and particularly in depositing a uniformly dense layer of said flock fibers upon a substrate of a width up to and exceeding 72 inches.

As the result of experiment, it appears that optimum results, so far as the deposit of flock fiber is concerned, are attained when the individual grid bars are of approximately the following construction, thus the conductor 6 would be of copper wire (preferably braided) and coaxial with the cylindrical matrix or insulating jacket (the latter having a radial thickness of one-half inch) and encased in a fiberglass tube T of an outside diameter of 2 inches and having a wall thickness of three-sixteenth of an inch. The rotary polyvinyl chloride tubular roll R is of an outside diameter of 2⅜ inches, with a wall thickness of three-sixteenth inch. The grid bars B, B1, etc. are parallel and spaced apart 6 inches on centers and of a length appropriate to the intended use. For instance, in a machine for depositing flock upon a substrate, the grid, as a whole, should be of a width such as to extend completely across the substrate.

While desirable, the above dimensions are suggested merely by way of example and are not to be regarded as limiting. With such an arrangement as above described it is possible to employ alternating current of as high as 100,000 volts, thus establishing an electrostatic field of so high intensity that optimum results are obtained in the deposit of flock fibers, even those of substantial length and low denier. Even at such high voltages there is no breakdown of the jacket material and the polyethylene is of sufficient stiffness is that the bars do not sag while the device is in use.

Obviously, the number of grid bars will be varied in accordance with the number of hoppers, and the length of the grid bars will be determined by reference to the width of the substrate to which flock is to be applied.

I claim:

1. A grid for developing a high-potential electrostatic field by the use of alternating current, said grid comprising a continuously elongate unitary electric conductor element embedded at the center of a jacket of cylindrical cross section comprised of synthetic plastic material, said jacket having a radius which exceeds the diameter of the conductor and, said synthetic plastic of the jacket being characterized in that it is adapted to be bent through an angle of 180° to dispose sections of predetermined length in spaced parallel relation without fracture and when so bent into parallel relation to retain said shape and means for connecting the ends of the conductor to a source of alternating current.

2. In combination, in apparatus for applying flock fibers to a substrate and wherein the flock fibers are dropped from elevated distributing means onto the substrate while the latter is moving horizontally and wherein, for producing an electrostatic field between the distributing means and the substrate, there is arranged a grid, said grid including a continuous unitary, elongate, metalic conductor embedded in a cylindrical jacket of normally rigid insulating material of high-dielectric strength, but which may be bent to an angle of approximately 180° without fracture and when so bent is shape retaining and a protective sleeve casing the insulated material, the conductor, with the insulating material and sleeve being bent at regularly spaced intervals of predetermined length to form a series of spaced parallel grid bars, adjacent grid bars being united by U-bends, means for supporting the grid with its bars in a horizontal plane between the flock distributing means and the substrate, the opposite ends of the conductor extending outwardly beyond the ends of the insulation and protective sleeve, and means operative to supply alternating electrical current to the ends of the conductor.

3. A combination according to claim 2 wherein said insulating jacket consists of a synthetic plastic having a dielectric constant of from 2.25 to 2.35 at 60 cycles.

4. In a combination according to claim 3, further characterized in that the jacket of insulating material is encased on a sleeve of fiberglass.

5. In a combination according to claim 3, wherein surrounding and coaxial with each of said bars of the grid, there is a rotatable hollow cylindrical roll, and means for rotating each of said rolls slowly at a constant speed.

6. A grid for establishing an electrostatic field of high intensity and which does not arc, nor exhibit corona effects when energized by the application of a current exceeding 40,000 volts and which is highly useful in applying flock fibers exceeding 2.0 mm. in length and of a denier from 3 to 18 to an adhesively coated substrate, said grid comprising a continuous unitary length of metal conductor embodied in a cylindrical jacket of insulated material having a dielectric strength approximating that of polyethylene, said conductor with its embedding jacket being arranged to form a plurality of spaced parallel bars with adjacent bars united by smooth 180° bends of a radius of approximately 3 inches, the opposite ends of the conductor being connected to a source of alternating currents of from 40,000 to 100,000 volts.

7. A method of making a grid comprising providing a continuously elongate, unitary electrical conductor, embedded in a jacket of cylindrical cross section comprised of a synthetic plastic shape-retaining material capable of being bent 180° without fracture, threading onto said elongate, jacketed conductor, a plurality of hollow, rigid, cylindrical sleeves of a predetermined length corresponding in number and length to the dimensions of the grid to be made, said sleeves being of larger inside diameter than the outside diameter of the jacketed conductor to enable rotation of the sleeves on the jacketed conductor, bending the jacketed conductor between adjacent ends of the sleeves, 180° and reversely from sleeve to sleeve to dispose adjacent sleeves in spaced, parallel relation, and mounting the resulting spaced, parallel sections between rigid, supporting rails with the ends of the sleeves journeled in said rails for rotation about said parallel conductor sections.

8. A method according to claim 7 comprising securing sheaves to the ends of the sleeves at one side of the supporting structure.

9. A method according to claim 7 comprising bending the jacketed conductor on a radius of approximately 3 inches.

* * * * *